US012319155B2

(12) United States Patent
Kaneko et al.

(10) Patent No.: US 12,319,155 B2
(45) Date of Patent: Jun. 3, 2025

(54) DRIVE SYSTEM FOR DUMP TRUCK

(71) Applicant: Hitachi Construction Machinery Co., Ltd., Tokyo (JP)

(72) Inventors: Satoru Kaneko, Tokyo (JP); Kazuo Nishihama, Tokyo (JP); Masatoshi Yoshimura, Tokyo (JP); Kosuke Matsuo, Tokyo (JP); Seiji Ishida, Tsuchiura (JP); Toshihiko Watanabe, Tsuchiura (JP); Tokuma Ikegami, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/025,002

(22) PCT Filed: Feb. 8, 2022

(86) PCT No.: PCT/JP2022/004956
§ 371 (c)(1),
(2) Date: Mar. 7, 2023

(87) PCT Pub. No.: WO2022/201927
PCT Pub. Date: Sep. 29, 2022

(65) Prior Publication Data
US 2023/0373320 A1    Nov. 23, 2023

(30) Foreign Application Priority Data
Mar. 26, 2021    (JP) .................... 2021-053049

(51) Int. Cl.
*B60L 50/13*    (2019.01)
*B60L 1/00*    (2006.01)

(52) U.S. Cl.
CPC .............. *B60L 50/13* (2019.02); *B60L 1/003* (2013.01); *B60L 2200/44* (2013.01); *B60L 2210/10* (2013.01); *B60L 2210/30* (2013.01); *B60L 2210/40* (2013.01); *B60L 2240/12* (2013.01)

(58) Field of Classification Search
CPC ...... B60L 50/13; B60L 1/003; B60L 2200/44; H02P 9/00
See application file for complete search history.

(56) References Cited

U.S. PATENT DOCUMENTS 4,652,807 A * 3/1987 Nagura ..................... H02P 1/26
318/778
4,742,288 A * 5/1988 Sugimoto ................. H02P 9/10
318/818

(Continued)

FOREIGN PATENT DOCUMENTS

DE     43 02 704 A1    8/1994
JP     6-14600 A       1/1994

(Continued)

OTHER PUBLICATIONS

International Search Report (PCT/ISA/210) issued in PCT Application No. PCT/JP2022/004956 dated Mar. 29, 2022 with English translation (four (4) pages).

(Continued)

*Primary Examiner* — Kyle J Moody
*Assistant Examiner* — Lakaisha Jackson
(74) *Attorney, Agent, or Firm* — Crowell & Moring LLP

(57) ABSTRACT

An object of the present invention is to provide a drive system for a dump truck capable of suppressing increase in size of a converter that controls a two-winding induction generator. To this end, the drive system for a dump truck includes a DC-DC converter connected to a main side DC bus and an auxiliary side DC bus, and a controller controls the DC-DC converter such that electric power of the main side DC bus is supplied to the auxiliary side DC bus via the DC-DC converter.

3 Claims, 11 Drawing Sheets

(56) References Cited

U.S. PATENT DOCUMENTS

| | | | | |
|---|---|---|---|---|
| 8,854,015 | B2* | 10/2014 | Deng | H02P 21/12 |
| | | | | 322/27 |
| 2005/0276020 | A1* | 12/2005 | Ahmad | H02P 29/40 |
| | | | | 361/698 |
| 2007/0216165 | A1* | 9/2007 | Oohara | H02P 9/00 |
| | | | | 290/44 |
| 2013/0154264 | A1 | 6/2013 | Hatanaka et al. | |
| 2017/0074243 | A1* | 3/2017 | Baba | F03D 7/0284 |
| 2018/0272871 | A1 | 9/2018 | Takada et al. | |
| 2020/0180588 | A1 | 6/2020 | Tanaka et al. | |
| 2022/0001854 | A1 | 1/2022 | Kadota et al. | |

FOREIGN PATENT DOCUMENTS

| | | |
|---|---|---|
| JP | 2000-224709 A | 8/2000 |
| JP | 2018-149882 A | 9/2018 |
| JP | 2019-88170 A | 6/2019 |
| WO | WO 2012/026026 A1 | 3/2012 |
| WO | WO 2018/047270 A1 | 3/2018 |
| WO | WO 2020/116272 A1 | 6/2020 |

OTHER PUBLICATIONS

Japanese-language Written Opinion (PCT/ISA/237) issued in PCT Application No. PCT/JP2022/004956 dated Mar. 29, 2022 (three (3) pages).

International Preliminary Report on Patentability (PCT/IB/338 & PCT/IB/373) issued in PCT Application No. PCT/JP2022/004956 dated Oct. 5, 2023, including English translation (Japanese-language Written Opinion (PCT/ISA/237), filed on Mar. 7, 2023) (5 pages).

Extended European Search Report issued in European Application No. 22774728.4 dated Dec. 16, 2024 (11 pages).

* cited by examiner

DRIVE SYSTEM FOR DUMP TRUCK

TECHNICAL FIELD

The present invention relates to a drive system that includes a two-winding induction generator having a primary winding including a main winding and an auxiliary winding.

BACKGROUND ART

In a mine, in order to transport ores or stripped soil from a loading place to an unloading place, a large number of dump trucks having a load capacity of 100 tons or more are operating. A route from the loading place to the unloading place is determined fixedly, and a dump truck repeatedly travels back and forth along the same route. Along one route, a plurality of dumps of the same vehicle rank travel, and the operating time of them is 24 hours. In regard to a plurality of dump trucks that are large in size and operate for a long period of time, the transportation efficiency indicated by a work load per unit cost (initial cost+running cost) is emphasized. Therefore, for dump trucks, in order to aim for improvement of this barometer, various measures are taken such that the initial cost is suppressed as far as possible and the running cost is reduced. In order to reduce the running cost, a drive system that is high in efficiency and requires a less maintenance cost is needed in order to reduce the fuel consumption. An electric drive system is available as one of such drive systems that are high in efficiency and can suppress the cost required for the maintenance. While a mechanical drive system transmits power of an engine to tires using a torque converter and a speed change gear, the electric drive system drives a generator by an engine and uses electric power generated by the generator to drive a traction motor linked to a tire shaft. As such an electric drive system for a dump truck as just described, for example, a technology disclosed in Patent Document 1 is available. According to this technology, the electric drive system for a dump truck includes a main generator that supplies electric power to a traction motor, an auxiliary generator that supplies electric power to an auxiliary machine device, and a DC-DC converter that receives regenerative power from the traction motor, which is generated upon retarding (electric braking) of the vehicle, as an input thereto and supplies electric power to the auxiliary machine device, and the electric drive system can thereby reduce the energy consumption of the auxiliary generator.

Further, in regard to a hybrid vehicle to which an electric drive system is applied, for example, a technology disclosed in another patent document is available. According to this technology, the electric drive system includes a converter that converts a high voltage power supply to a low voltage and includes an auxiliary battery that supplies electric power to various electrical equipment. For the backup of the auxiliary power supply circuit, an alternator is linked to an engine separately such that, even in a case where the auxiliary power supply fails, operation of the various electrical equipment can be performed.

PRIOR ART DOCUMENT

Patent Documents

Patent Document 1: PCT Patent Publication No. WO2018/047270
Patent Document 2: JP-2000-224709-A

SUMMARY OF THE INVENTION

Problems to be Solved by the Invention

In Patent Document 1, the main generator and the auxiliary generator are configured from field winding generators separate from each other, and also some slip rings for supplying field current to a rotor are needed for each of the field winding of the generators. This makes the physique of the overall generators large and also increases the cost. Further, the DC-DC converter that supplies electric power to the auxiliary machine equipment supplies regenerative power from the traction motor upon retarding (electric braking) of the vehicle, and nothing is mentioned about scaling down of the converter for power generation that operates upon normal traveling of the vehicle.

Meanwhile, Patent Document 2 describes nothing of means for supplying electric power to the various electric equipment simultaneously from the auxiliary power supply and the alternator, and each of the power supplies can solely supply electric power to the electric equipment. Patent Document 2 thus mentions nothing about scaling down of the various power supplies.

Therefore, it is conceivable to use, as means for solving the problems described above, a two-winding induction generator in which a winding of a main generator and a winding of an auxiliary generator are formed as an integrated generator (of the two-winding type) and no slip ring is needed. However, this two-winding induction generator seems to have problems in that it needs a converter for control and that, in order to satisfy power generation of the main winding side and power generation of the auxiliary winding side at the same time, the converter is increased in size.

The present invention has been made in view of the problems described above, and the object of the present invention resides in provision of a drive system for a dump truck capable of suppressing increase in size of a converter that controls a two-winding induction generator.

Means for Solving the Problems

In order to achieve the object described above, according to the present invention, there is provided a drive system for a dump truck, the drive system including a two-winding induction generator having a primary winding including a main winding and an auxiliary winding, a rectifier that rectifies AC power generated in the main winding into DC power, an auxiliary converter that converts AC power generated in the auxiliary winding into DC power, a traction inverter that is connected to the rectifier through a main side DC bus, converts the DC power supplied from the rectifier into AC power, and supplies the AC power to a traction motor of the dump truck, an auxiliary machine inverter that is connected to the auxiliary converter through an auxiliary side DC bus, converts the DC power supplied from the auxiliary converter into AC power, and supplies the AC power to an auxiliary machine motor of the dump truck, and a controller that controls the auxiliary converter, in which the drive system further includes a DC-DC converter connected to the main side DC bus and the auxiliary side DC bus, and the controller controls the DC-DC converter such that electric power of the main side DC bus is supplied to the auxiliary side DC bus via the DC-DC converter.

With the present invention configured in such a manner as described above, since electric power can be supplied from both of the auxiliary converter and the DC-DC converter to the auxiliary machine inverter, increase in reactive electric current flow to the auxiliary converter (drop of the power factor on the auxiliary winding side) can be suppressed. Consequently, it is possible to scale down the auxiliary converter while the efficiency of the drive system is maintained.

Advantages of the Invention

With the present invention, in the drive system for a dump truck that includes a two-winding induction generator, it becomes possible to suppress increase in size of the converters that control the two-winding induction generator.

MODES FOR CARRYING OUT THE INVENTION

Figure 1:
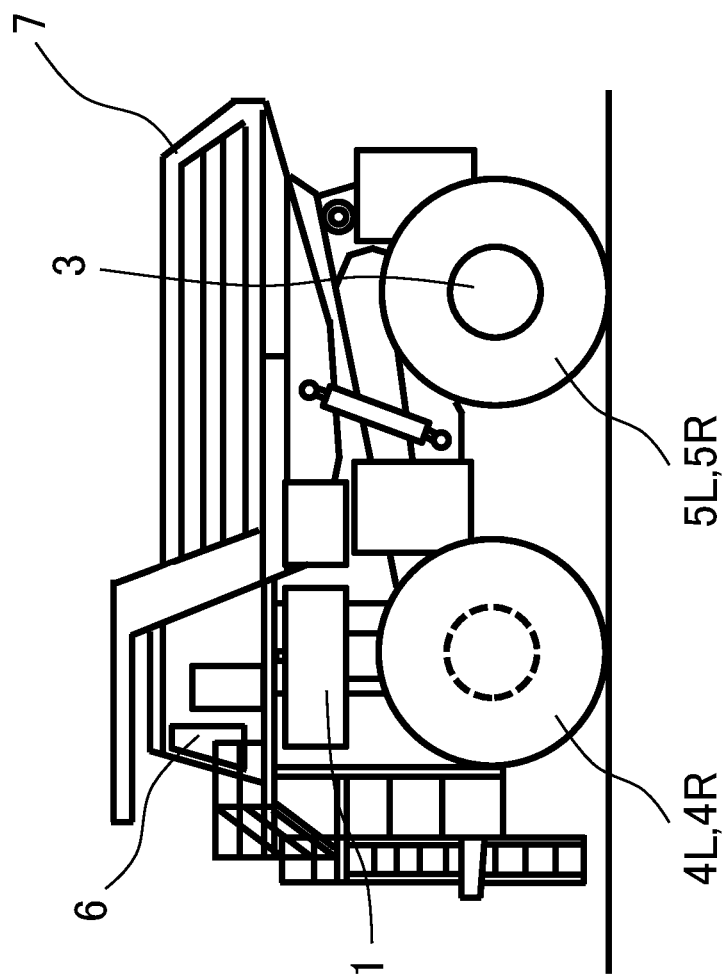
FIG. 1 is a schematic diagram of a dump truck for mining in which a drive system according to an embodiment of the present invention is incorporated.

In the following, an embodiment of the present invention is described with reference to the drawings. It is to be noted that, in the figures, like elements are denoted by like reference characters and overlapping description of them is omitted suitably.

First, a dump truck for mining in which a drive system according to the embodiment of the present invention is incorporated is described. The dump truck for mining repeatedly performs a series of work cycles of loading sediment at a loading place, traveling from the loading place to an unloading place, discharging the sediment at the unloading place, and traveling from the unloading place to the loading place.

FIG. 1 depicts a configuration of a dump truck for mining. Referring to FIG. 1, the dump truck for mining includes a carrier 7 attached pivotably in an upward and downward direction at an upper side rear portion of a vehicle body, and a driving seat 6 provided at an upper side front portion of the vehicle body. Further, a pair of left and right driven wheels 4L and 4R are disposed on the lower front side of the vehicle body, and a pair of left and right driving wheels 5L and 5R are disposed on the lower rear side of the vehicle body. The driving wheels 5L and 5R are driven by a traction motor 3.

Now, a drive system of the electrically driven type that drives the driving wheels 5L and 5R is described.

Figure 2:
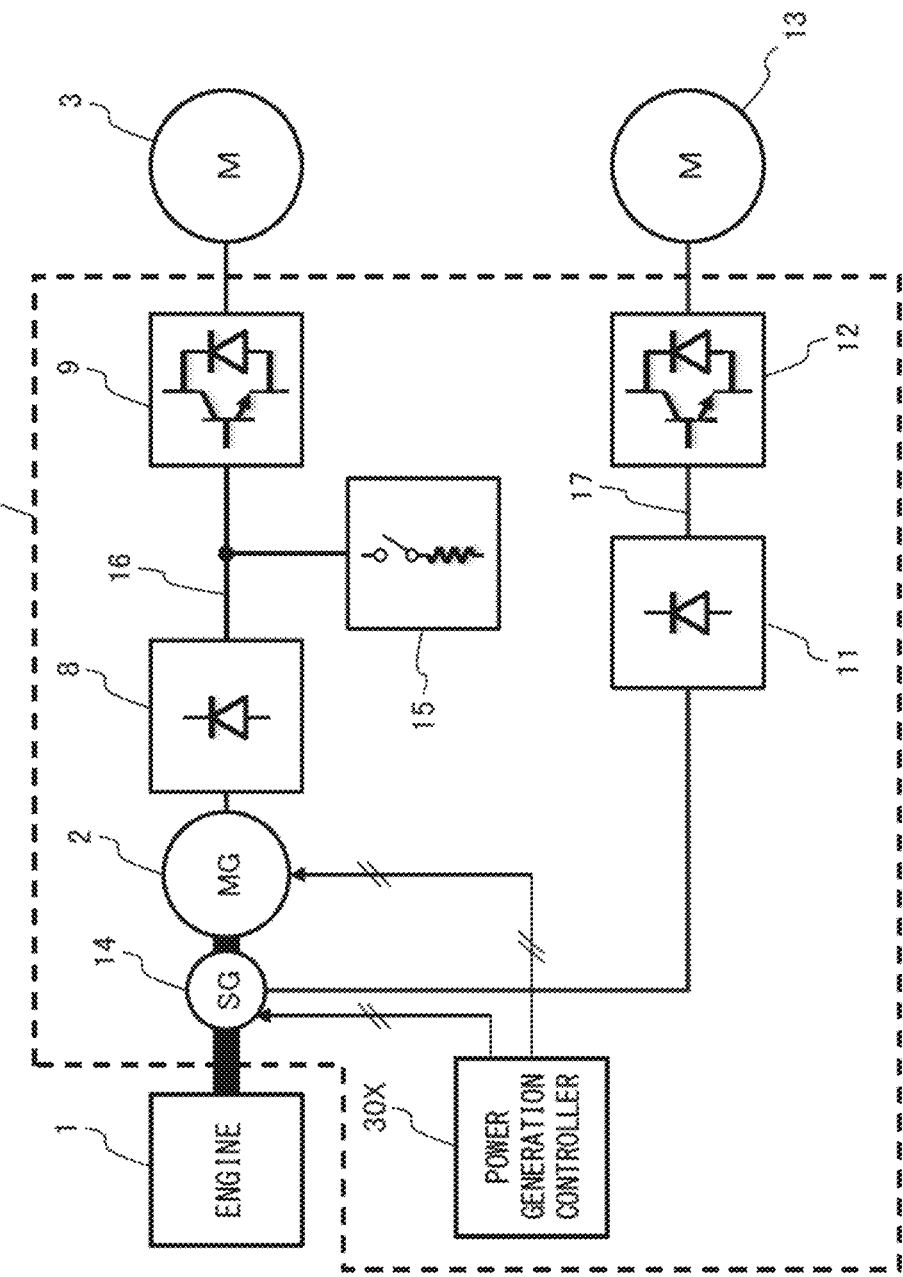
FIG. 2 is a block diagram of a drive system according to a prior art.

FIG. 2 depicts a configuration of a drive system according to a prior art. Referring to FIG. 2, the drive system 100X includes a main generator (MG: Main Generator) 2 and an auxiliary generator (SG: Sub Generator) 14 that are driven by an engine 1, a traction motor 3 that drives the driving wheels 5L and 5R, an auxiliary machine motor 13, a traction inverter 9, an auxiliary machine inverter 12, a rectifier 8, an auxiliary rectifier 11, a discharging resistor 15, and a power generation controller 30X that controls the main generator 2 and the auxiliary generator 14.

The main generator 2 and the auxiliary generator 14 convert rotational energy of the engine 1 into electric energy (AC power). The rectifier 8 rectifies AC power supplied from the main generator 2 into DC power and supplies the DC power to the traction inverter 9. The traction inverter 9 converts the DC power supplied from the rectifier 8 into AC power and supplies the AC power to the traction motor 3.

The auxiliary generator 14 is utilized as a power supply for an auxiliary machine system that drives an auxiliary machine such as cooling equipment. The auxiliary rectifier 11 rectifies AC power supplied from the auxiliary generator 14 into DC power and supplies the DC power to the auxiliary machine inverter 12. The auxiliary machine inverter 12 converts the DC power supplied from the auxiliary rectifier 11 into AC power and supplies the AC power to the auxiliary machine motor 13. The auxiliary machine motor 13 drives cooling equipment (not depicted) such as a blower. It is to be noted that, although only one set of the auxiliary machine inverter 12 and the auxiliary machine motor 13 is depicted as the auxiliary machine system in FIG. 2, since an actual vehicle includes a plurality of equipment that correspond to auxiliary machines, a plurality of auxiliary machine inverters and a plurality of auxiliary machine motors having capacities different from each other are incorporated.

Here, a configuration is examined which includes a DC-DC converter 10 that connects a main side DC bus 16 and an auxiliary side DC bus 17 to each other in order to make it possible to supply electric power of the main side DC bus 16 to the auxiliary side DC bus 17 in the drive system 100X depicted in FIG. 2.

Figure 3:
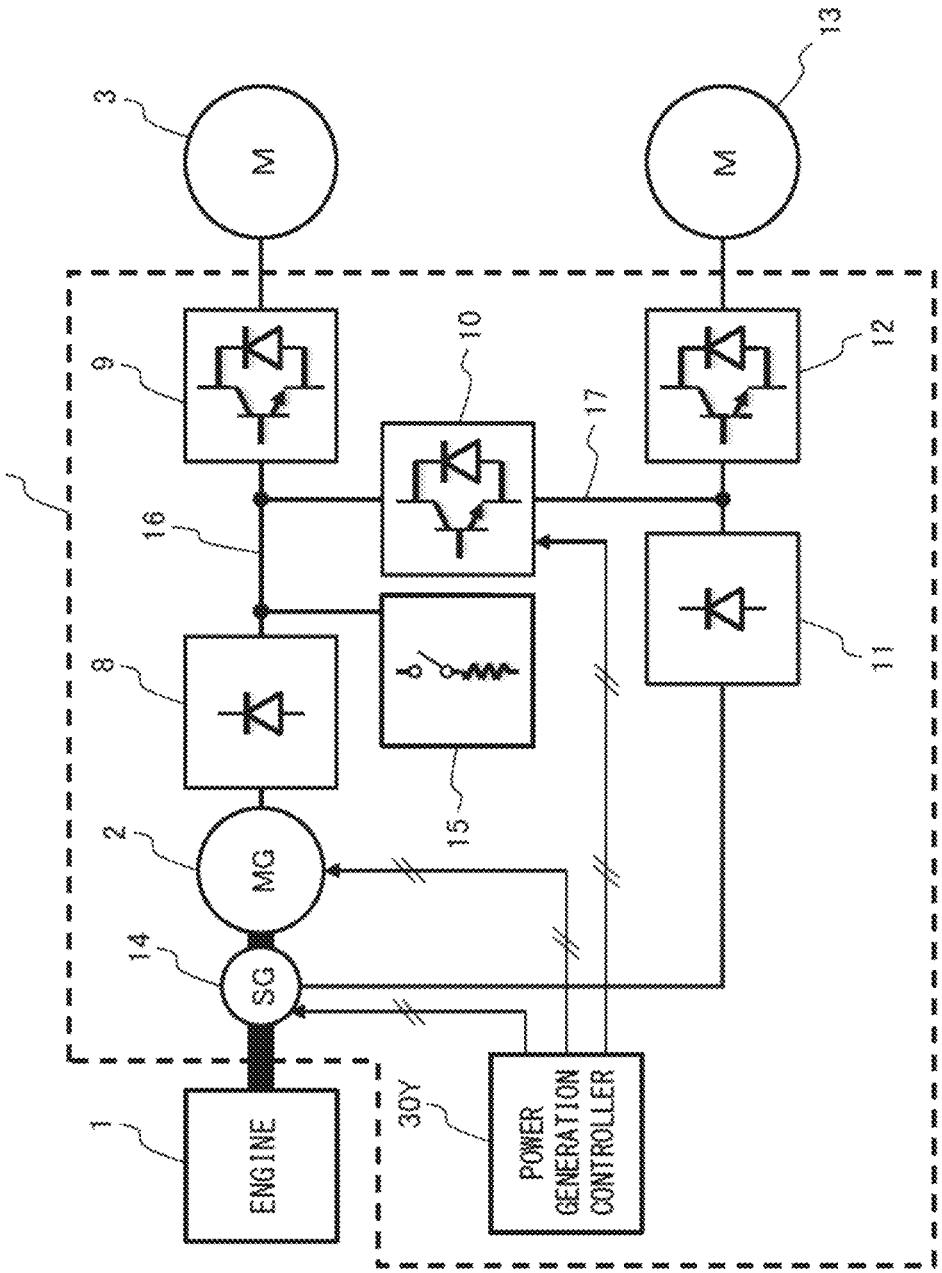
FIG. 3 is a block diagram depicting a modification of the drive system according to the prior art.

Referring to FIG. 3, a power generation controller 30Y can drive the auxiliary machine motor 13 by stepping down regenerative power from the traction motor 3, which is generated upon retarding (electric braking) of the vehicle, by the DC-DC converter 10 and supplying the stepped down regenerative power to the auxiliary machine inverter 12. By using regenerative power of the traction motor 3 upon retarding of the vehicle to drive the auxiliary machine, it becomes possible to reduce the power of the engine 1, which is consumed for driving of the auxiliary machine upon braking of the vehicle. This can contribute to reduction of the fuel consumption of the engine 1. It is to be noted that the regenerative electric power from the traction motor 3 is usually higher than power needed by the auxiliary machine and cannot be absorbed only by the DC-DC converter 10. Therefore, by consuming surplus regenerative power by the discharging resistor 15, electric braking force can be obtained without shortage from the traction motor 3.

The drive system 100Y described above basically is a drive system of the diesel electric type and drives the tires through a torque converter or a transmission without directly driving the tires, using rotation force of the engine as in a mechanically driven dump, and rotational driving of the engine is utilized for electric power generation of a generator. The drive system 100Y includes a main generator 2 that generates electric power to be used for traveling and an auxiliary generator 14 that generates electric power to be used for auxiliary machine driving. Although the types of the generators are not specifically restricted, for example, if they are formed as field winding generators in which a field winding is provided on the rotor, then a converter that is needed when generated electric power is converted into direct current as depicted in FIG. 3 can be formed from an inexpensive rectifier. However, where the field winding type generator described above is used, the main generator 2 and the auxiliary generator 14 are configured from separate generators and need a slip ring for supplying field current to the rotor, resulting in increase in size of the physique of the overall generator and also in cost.

Therefore, as means for solving the problems, it is conceivable to use, in place of the main generator 2 and the auxiliary generator 14, a two-winding induction generator in which the winding of the main generator 2 and the winding of the auxiliary generator 14 are formed as an integrated generator (of the two-winding type) and besides do not need a slip ring is applied.

Figure 4:
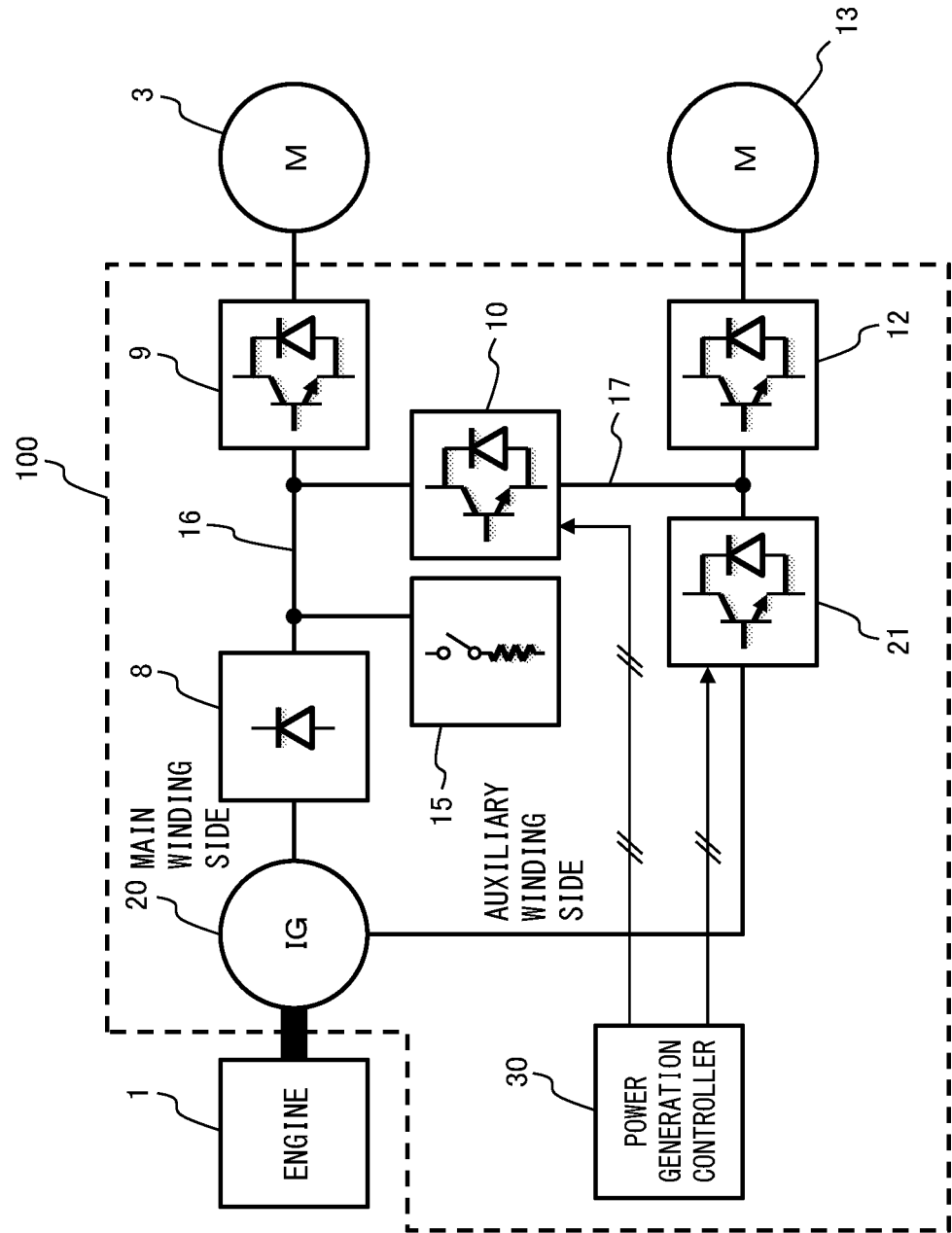
FIG. 4 is a block diagram of the drive system according to the embodiment of the present invention.

FIG. 4 depicts a configuration of a drive system according to the present embodiment. Referring to FIG. 4, the drive system 100 includes a two-winding induction generator (IG: Induced Generator) 20, a traction inverter 9, an auxiliary machine inverter 12, a rectifier 8, an auxiliary converter 21, a discharging resistor 15, a DC-DC converter 10, and a power generation controller 30 that controls the auxiliary converter 21 and the auxiliary converter 21.

The rectifier 8 is connected, at the AC side thereof, to the main winding of the two-winding induction generator 20 and connected, at the DC side thereof, to the traction inverter 9 and the discharging resistor 15 through the main side DC bus 16. The rectifier 8 rectifies AC power generated in the main winding into DC power and supplies the DC power to the main side DC bus 16. The discharging resistor 15 is connected to the main side DC bus 16. The discharging resistor 15 is energized upon regeneration action (upon retarding) of the traction motor 3 and consumes electric power (regenerative power) generated by a regeneration action of the traction motor 3. The auxiliary converter 21 is connected, at the AC side thereof, to the auxiliary winding of the two-winding induction generator 20 and connected, at the DC side thereof, to the auxiliary machine inverter 12 through the auxiliary side DC bus 17. The auxiliary converter 21 converts AC power generated in the auxiliary winding into DC power and supplies the DC power to the auxiliary side DC bus 17.

Here, since the main winding of the two-winding induction generator 20 is connected to the traction inverter 9 only by the rectifier 8 without connection of a battery or a capacity of a large capacity or is not connected to an electric power system, the output voltage of the main winding of the two-winding induction generator 20 need not be a fixed voltage. Further, the voltages of the main winding and the auxiliary winding of the two-winding induction generator 20 vary substantially in proportion to each other. Therefore, by changing the voltage of the auxiliary winding of the two-winding induction generator 20 by the auxiliary converter 21, the output voltage of the main winding can be changed. Since the main winding can be excited from the auxiliary winding of the two-winding induction generator 20 by the auxiliary converter 21, the generator including the main side and the auxiliary side can be configured in a brushless configuration.

In the drive system 100 according to the present embodiment, since the capacity of the traction inverter 9 is greater than the capacity of the auxiliary machine inverter 12, it is advantageous in terms of the cost that a converter that is more expensive than a rectifier is connected not to the traction inverter 9 but to the auxiliary machine inverter 12 whose demanded electric power is low. Further, although the auxiliary machine inverter 12 is controlled with a fixed voltage, the auxiliary winding of the two-winding induction generator 20 is controlled with a variable voltage. Since the auxiliary converter 21 can step up the voltage of the auxiliary winding of the two-winding induction generator 20, by designing the two-winding induction generator 20 such that the voltage of the auxiliary winding of the two-winding induction generator 20 becomes lower than the voltage demanded by the auxiliary machine inverter 12, the two-winding induction generator 20 can operate with the voltage demanded by the auxiliary machine inverter 12.

Figure 5:
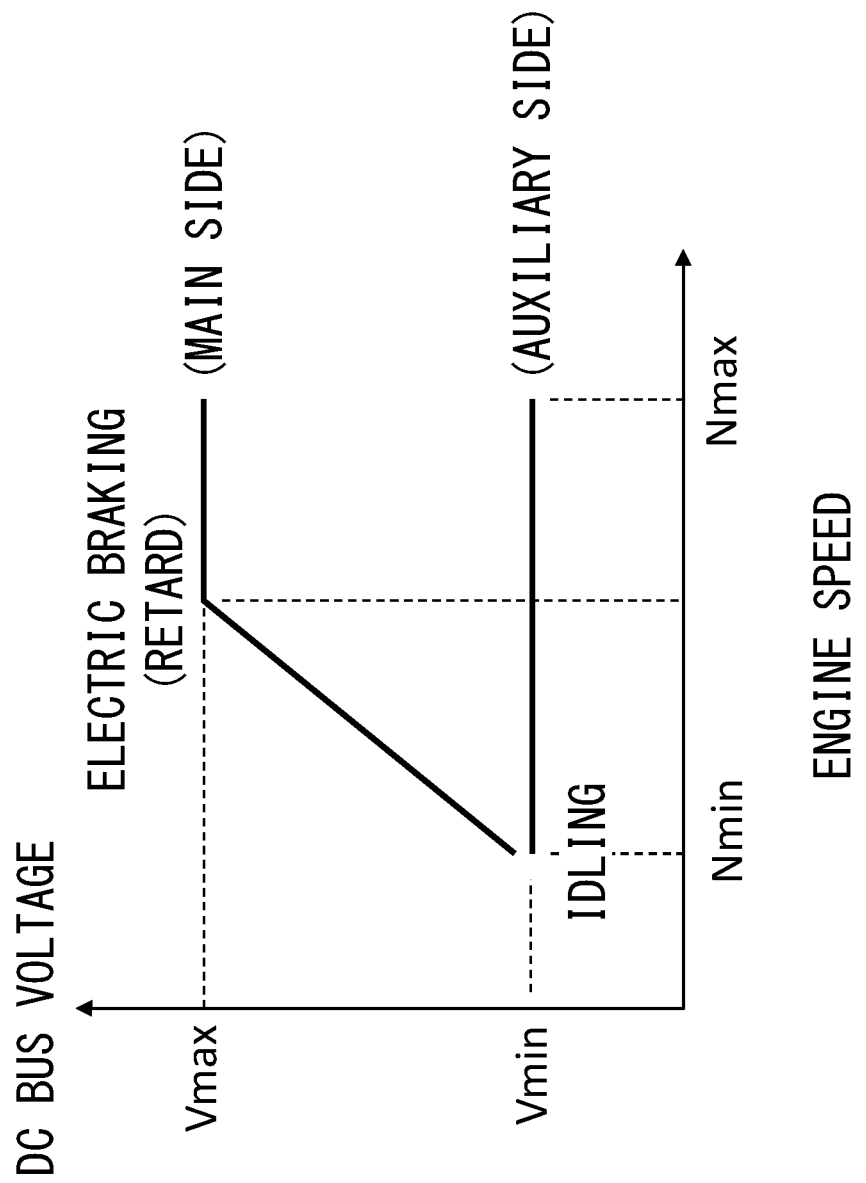
FIG. 5 is a view depicting a relation between an action of a dump truck and an action of a two-winding induction generator.

Here, a relation between an action of the dump truck and an action of the two-winding induction generator 20 is depicted in FIG. 5. The axis of abscissa indicates the engine speed and the axis of ordinate indicates the voltages of the main side DC bus 16 and the auxiliary side DC bus 17. The auxiliary side DC bus voltage in this instance is fixed at Vmin from the engine speed (Nmin) upon idling to the maximum speed (Nmax) of the engine. In contrast, the main side DC bus voltage is the lowest voltage (>Vmin) upon idling and increases as the engine speed increases. Upon retarding (electric braking) of the vehicle, the main side DC bus voltage operates in the proximity of the maximum voltage Vmax. On the other hand, upon normal traveling of the vehicle, the main side DC bus voltage varies within this voltage range. The power generation controller 30 controls the field current of the two-winding induction generator 20 via the auxiliary converter 21 such that, in such an action of the vehicle and a voltage range as just described, the main side output power (load) and the auxiliary side output power (load) of the two-winding induction generator 20 are balanced.

On the other hand, a vehicle that has an electric drive system such as a dump truck has actions that do not consume the load on the main side, namely, actions such as idling and retarding (electric braking). Since the main side output power is zero in the two actions, when the auxiliary side outputs electric power at this time, the voltage on the main side increases significantly. As a countermeasure for this case, it is conceivable, for example, to cause also the main side to generate electric power and cause the discharging resistor 15 depicted in FIG. 4 to consume the electric power thereby to establish output power balance between the main side and the auxiliary side. However, with this technique, the electric power generated by the main side is merely consumed by the discharging resistor 15 and therefore becomes mere loss, and as a result, the fuel cost of the vehicle is deteriorated. Further, upon idling, since the engine speed is low, also it is supposed that the discharge starting voltage of the discharging resistor 15 is not reached.

In order to cope with the subject described above, in the present embodiment, the DC-DC converter 10 depicted in FIG. 4 is used such that it acts to supply electric power generated by the main side to the auxiliary machine inverter 12. Since the DC-DC converter 10 acts in this manner, electric power generated by the main side upon idling or upon retarding can be supplied to the auxiliary machine. Therefore, the generated electric power is not consumed as loss by the discharging resistor 15 anymore and also it is possible to suppress deterioration of the fuel cost. Further, the DC-DC converter 10 is a converter of the step-down type, and therefore, by decreasing the main side DC bus voltage, which varies within a voltage range higher than that of the auxiliary side DC bus 17 in response to a vehicle action, to the auxiliary side DC bus voltage, electric power can be supplied from the main side DC bus 16 to the auxiliary machine inverter 12.

Figure 6:
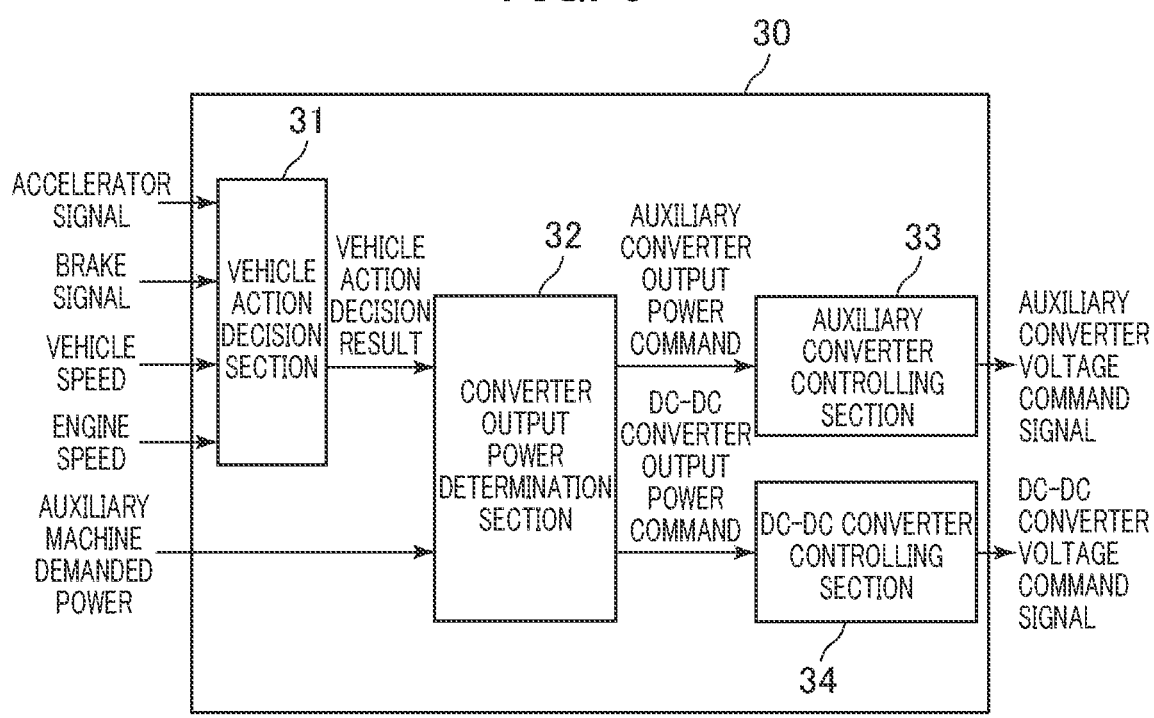
FIG. 6 is a functional block diagram of a power generation controller.

FIG. 6 is a functional block diagram of the power generation controller 30. Referring to FIG. 6, the power generation controller 30 includes a vehicle action decision section 31, a converter output power determination section 32, an auxiliary converter controlling section 33, and a DC-DC converter controlling section 34. The power generation controller 30 is configured from a controller having a computation processing function and implements functions of the sections by executing a program stored in a storage device such as a ROM.

The vehicle action decision section 31 decides which one of normal traveling, idling, and retarding the vehicle action is on the basis of an accelerator signal, a brake signal, a vehicle speed, and an engine speed, and outputs a result of the decision (vehicle action decision result) to the converter output power determination section 32. Here, the accelerator signal, brake signal, vehicle speed, and engine speed are inputted, for example, from the control system of the dump truck or various sensors to the power generation controller 30.

The converter output power determination section 32 determines an output power of the auxiliary converter 21 and an output power of the DC-DC converter 10 on the basis of a vehicle action decision result inputted from the vehicle action decision section 31 and an auxiliary machine demanded electric power signal (signal indicative of demanded electric power of the auxiliary machine inverter 12) inputted, for example, from the control system of the dump truck. Here, the output power of the auxiliary converter 21 and the output power of the DC-DC converter 10 are determined such that the sum of the output power of the auxiliary converter 21 and the output power of the DC-DC converter 10 becomes equal to the auxiliary machine demanded electric power. Further, the distribution of the output power of the auxiliary converter 21 and the output power of the DC-DC converter 10 from the auxiliary machine demanded electric power is adjusted in response to the vehicle action. The converter output power determination section 32 outputs a command for the instruction of the output electric power of the auxiliary converter 21 (auxiliary converter output power command) to the auxiliary converter controlling section 33, and outputs a command for the instruction of the output electric power of the DC-DC converter 10 (DC-DC converter output power command) to the DC-DC converter controlling section 34.

The auxiliary converter controlling section 33 determines an output voltage of the auxiliary converter 21 in accordance with the auxiliary converter output power command and outputs a command signal (auxiliary converter voltage command signal) for the instruction of the output voltage to the DC-DC converter 10. The DC-DC converter controlling section 34 determines the output voltage of the DC-DC converter 10 in accordance with the DC-DC converter output power command and outputs a command signal (DC-DC converter voltage command) for the instruction of the output voltage to the DC-DC converter 10.

Figure 7:
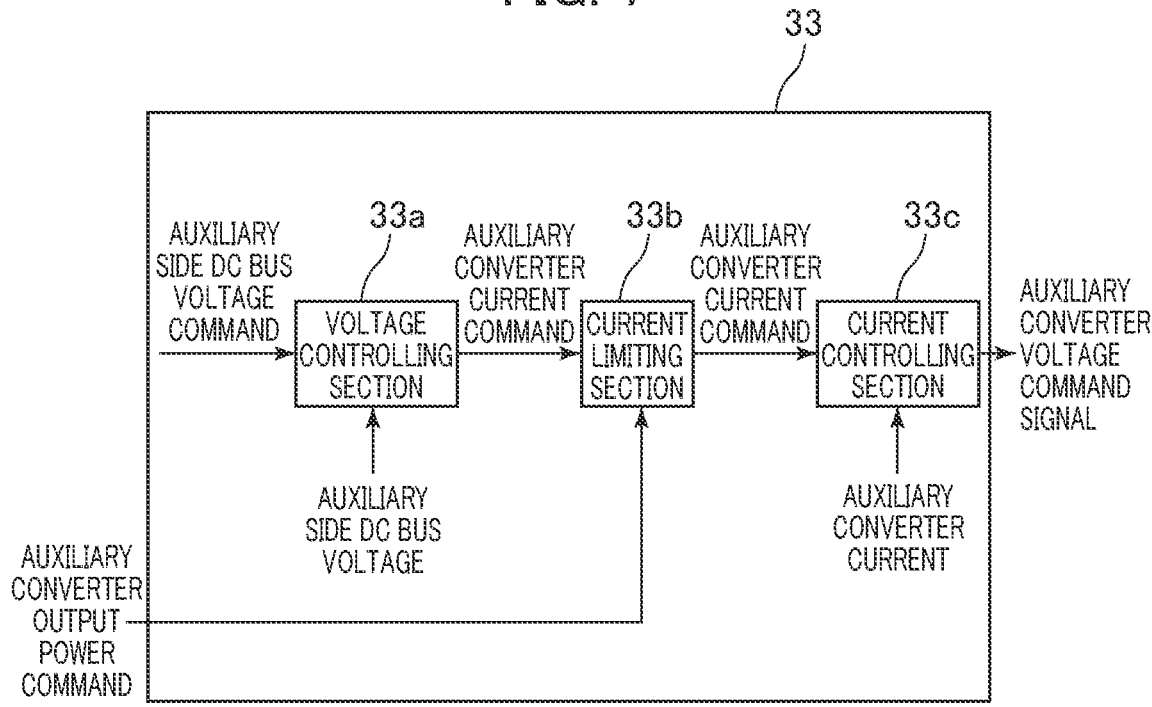
FIG. 7 is a functional block diagram of an auxiliary converter controlling section.

FIG. 7 is a functional block diagram of the auxiliary converter controlling section 33. Referring to FIG. 7, the auxiliary converter controlling section 33 includes a voltage controlling section 33a, a current limiting section 33b, and a current controlling section 33c. The auxiliary converter controlling section 33 performs feedback control of the auxiliary side DC bus voltage such that electric power corresponding to an auxiliary converter output power command is outputted from the auxiliary converter 21 to the auxiliary side DC bus 17.

The voltage controlling section 33a determines output current of the auxiliary converter 21 (auxiliary converter current command) such that the difference between an auxiliary side DC bus voltage command from the converter output power determination section 32 and an auxiliary side DC bus voltage determined in advance is minimized, and outputs the determined output current to the current limiting section 33b. The current limiting section 33b limits the auxiliary converter current command in accordance with the auxiliary converter output power command and outputs the limited auxiliary converter current command to the current controlling section 33c. The current controlling section 33c determines an output voltage of the auxiliary converter 21 such that the difference between the auxiliary converter current command and the auxiliary converter current is minimized, and outputs a command signal for the instruction of the output voltage (auxiliary converter voltage command signal) to the auxiliary converter 21. Consequently, electric power corresponding to the auxiliary converter output power command is supplied from the auxiliary converter 21 to the auxiliary side DC bus 17.

Figure 8:
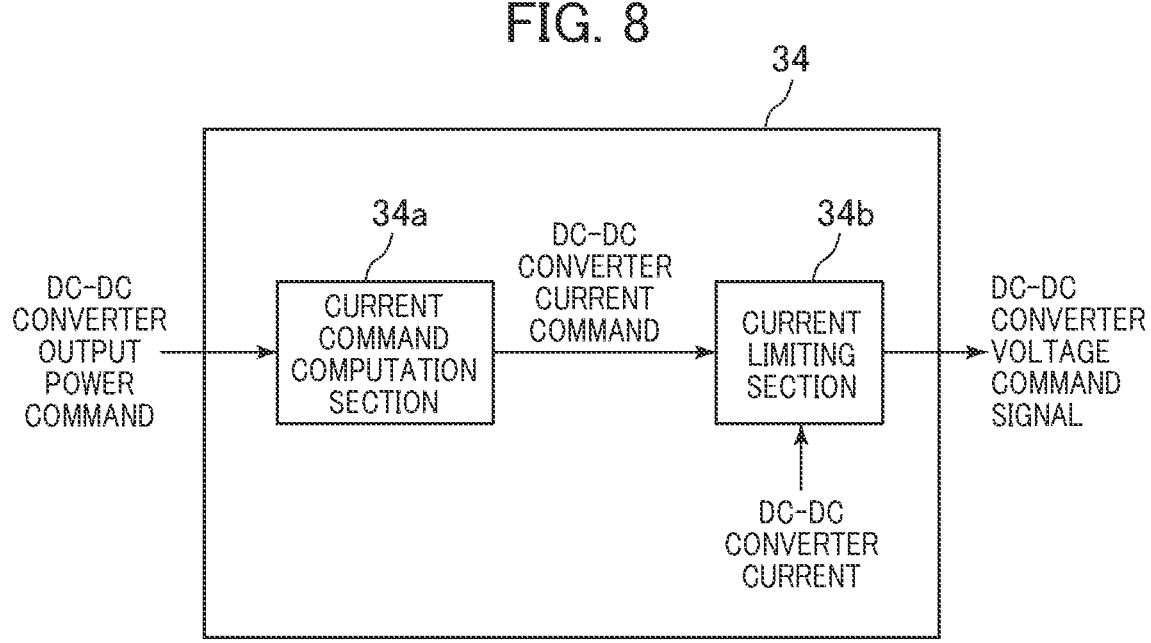
FIG. 8 is a functional block diagram of a DC-DC converter controlling section.

FIG. 8 is a functional block diagram of the DC-DC converter controlling section 34. Referring to FIG. 8, the DC-DC converter controlling section 34 includes a current command computation section 34a and a current controlling section 34b. The DC-DC converter controlling section 34 performs feedback control of the DC-DC converter current such that electric power corresponding to the DC-DC converter output power command is outputted from the DC-DC converter 10 to the auxiliary side DC bus 17.

The current command computation section 34a determines output current of the DC-DC converter 10 (DC-DC converter current command) such that electric power corresponding to the DC-DC converter output power command is outputted from the DC-DC converter 10, and outputs the determined output current to the current controlling section 34b. The current controlling section 34b determines an output voltage of the DC-DC converter 10 such that the difference between the DC-DC converter current command and a DC-DC converter current determined in advance is minimized, and outputs a command signal according to the output voltage (DC-DC converter voltage command signal) to the DC-DC converter 10. Consequently, electric power corresponding to the DC-DC converter output power command is supplied from the DC-DC converter 10 to the auxiliary side DC bus 17.

Figure 9:
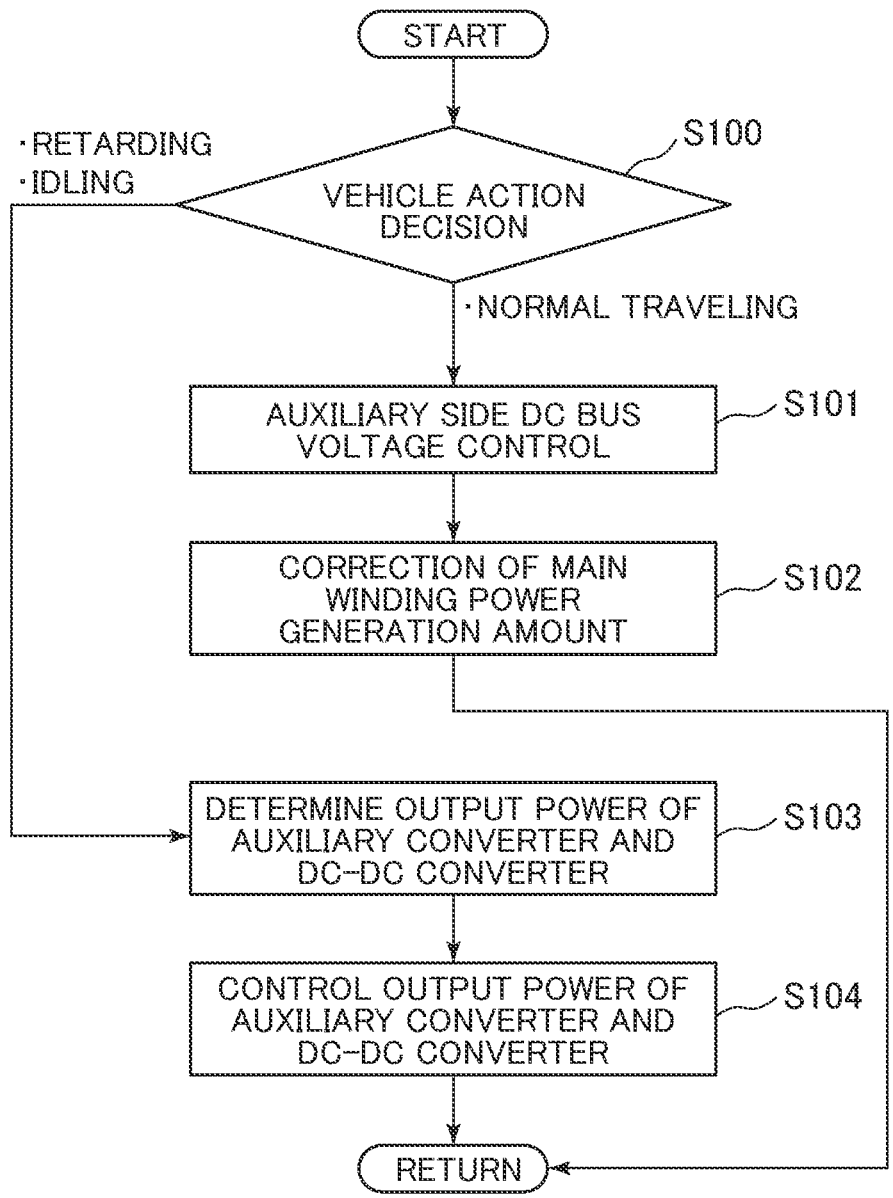
FIG. 9 is a flow chart depicting processing contents of the power generation controller.

FIG. 9 is a flow chart depicting processing contents of the power generation controller 30. In the following, individual steps are described in order.

First, the converter output power determination section 32 of the power generation controller 30 decides, on the basis of an accelerator signal, a brake signal, a vehicle speed, and an engine speed, which one of normal traveling, idling, and retarding the vehicle action is (step S100). For example, where conditions that the accelerator is OFF, that the brake is OFF, that the vehicle speed is lower than a threshold value that is set a little higher than zero, and that the engine speed is within a predetermined range lower than that upon normal traveling are satisfied, the converter output power determination section 32 decides that the vehicle action is idling. Meanwhile, for example, where conditions that the brake is ON, that the vehicle speed is equal to or higher than the threshold value, and that the engine speed is equal to or higher than a predetermined value are satisfied, the converter output power determination section 32 decides that the vehicle action is retarding. On the other hand, where conditions that the brake is OFF, that the vehicle speed is equal to or higher than the threshold value, and that the engine speed is equal to or higher than the predetermined value are satisfied, the converter output power determination section 32 decides that the vehicle action is normal traveling.

Where it is decided in step S100 that the vehicle action is normal traveling, the converter output power determination section 32 and the auxiliary converter controlling section 33 carry out voltage control of the auxiliary side DC bus 17 (step S101). Consequently, the two-winding induction generator 20 generates electric power demanded by the auxiliary machine inverter 12 by the auxiliary winding thereof and drives the auxiliary machine motor 13. Here, if the power generation amount of the auxiliary winding in the two-winding induction generator 20 varies, then also the power generation amount and the voltage of the main winding vary. As a result, if an influence of the variation on the action of the traction motor 3 occurs, then the power generation amount of the main winding is corrected (step S102). This power generation amount correction of the main winding can be carried out, for example, by distributing the power generation amount from the main winding to the auxiliary machine inverter 12 through the DC-DC converter 10. After step S102, processes in and after step S100 are performed repeatedly.

Where it is decided in step S100 that the vehicle action is retarding or idling, the converter output power determination section 32 determines an output power of the auxiliary converter 21 and an output power of the DC-DC converter 10 (step S103). In particular, the converter output power determination section 32 receives, as an input thereto, an auxiliary machine demanded electric power determined separately from the state of the vehicle at the time, determines output power commands for the auxiliary converter 21 and the DC-DC converter 10, and controls the output power of them on the basis of the output power commands. It is to be noted that, in regard to the configuration of the converter output power determination section 32, an action signal of the vehicle and an auxiliary machine demanded electric power may be inputted thereto to determine output power commands for the converters by table search or determine such output power commands by computation on the basis of a characteristic formula of the generator. Further, as regards an output power command of each converter, although it is possible to change the magnitude of it freely, for example, if the converters individually share one half of the auxiliary machine demanded electric power, then the capacities of them can be minimized and besides made same as each other.

Subsequently to step S103, the auxiliary converter controlling section 33 controls the output power of the auxiliary converter 21 and the DC-DC converter controlling section 34 controls the output power of the DC-DC converter 10 (step S104). After step S104, the processes in and after S100 are repeated.

Figure 10:
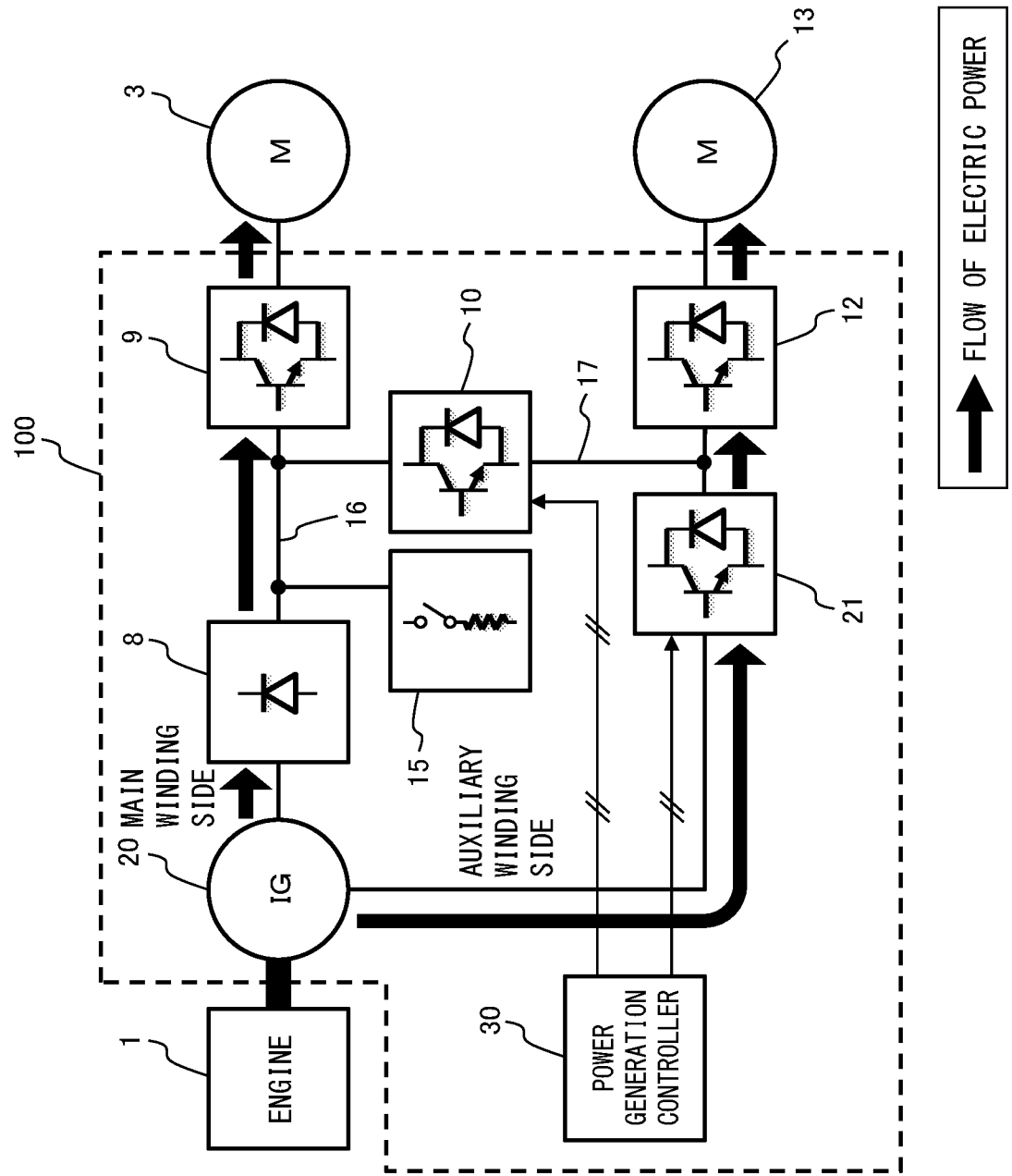
FIG. 10 is a view depicting a flow of electric power of the drive system in a case where it is decided that the vehicle action is normal traveling.

FIG. 10 depicts a flow of electric power of the drive system 100 in a case where it is decided that the vehicle action is normal traveling. Referring to FIG. 10, electric power generated in the main winding of the two-winding induction generator 20 is supplied to the main side DC bus 16 via the rectifier 8. The electric power supplied to the main side DC bus 16 is supplied to the traction motor 3 via the traction inverter 9. Electric power generated in the auxiliary winding of the two-winding induction generator 20 is supplied to the auxiliary side DC bus 17 via the auxiliary converter 21. The electric power supplied to the auxiliary side DC bus 17 is supplied to the auxiliary machine motor 13 via the auxiliary machine inverter 12.

Figure 11:
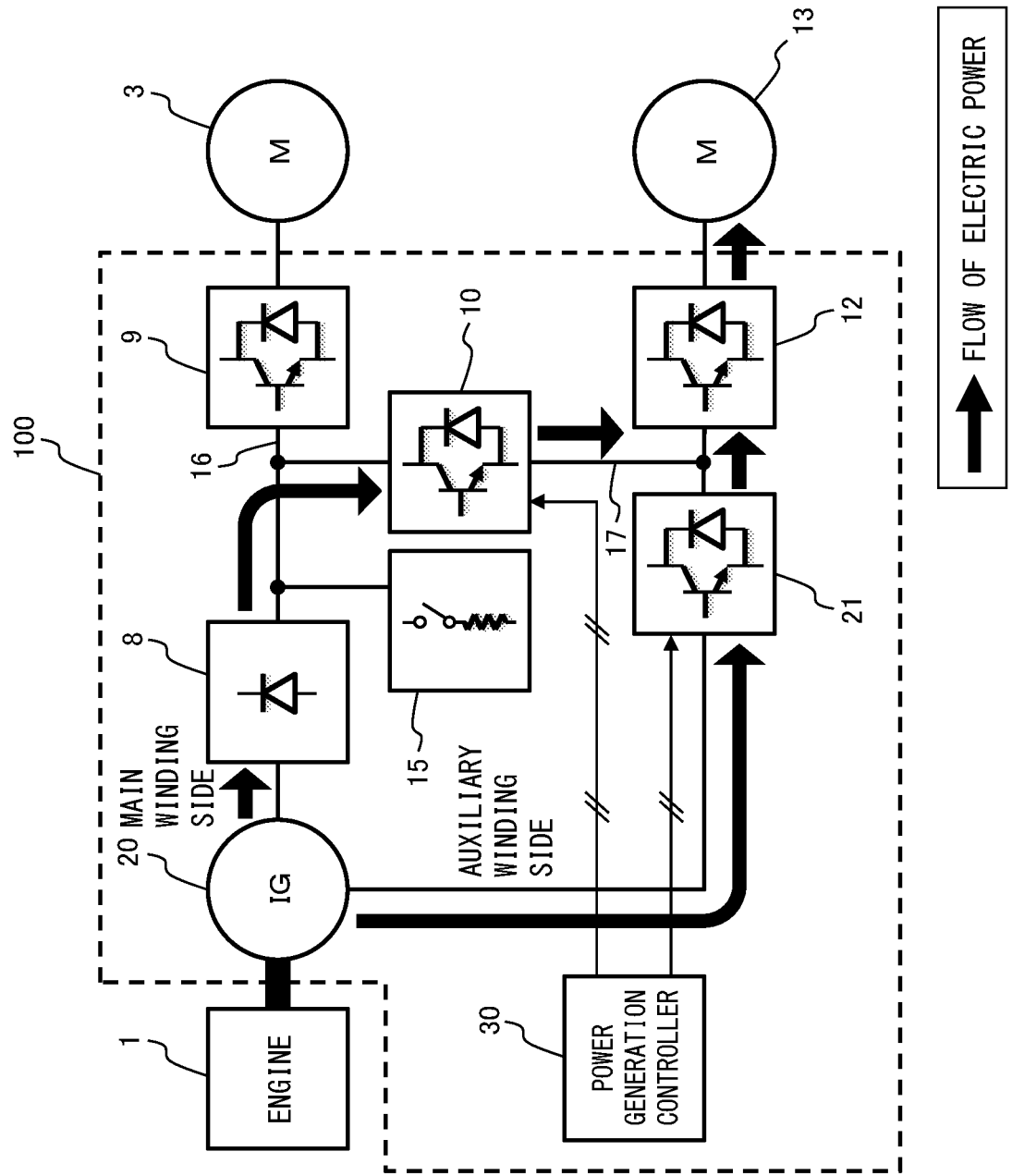
FIG. 11 is a view depicting a flow of electric power of the drive system in a case where it is decided that the vehicle action is idling.

FIG. 11 depicts a flow of electric power of the drive system 100 when it is decided that the vehicle action is idling. Referring to FIG. 11, electric power generated in the main winding of the two-winding induction generator 20 is supplied to the main side DC bus 16 via the rectifier 8. The electric power supplied to the main side DC bus 16 is supplied to the auxiliary side DC bus 17 via the DC-DC converter 10. Electric power generated in the auxiliary winding is supplied to the auxiliary side DC bus 17 via the auxiliary converter 21. Consequently, the sum of the output electric power of the auxiliary converter 21 and the output electric power of the DC-DC converter 10 (=auxiliary machine demanded electric power) is supplied to the auxiliary machine inverter 12.

Figure 12:
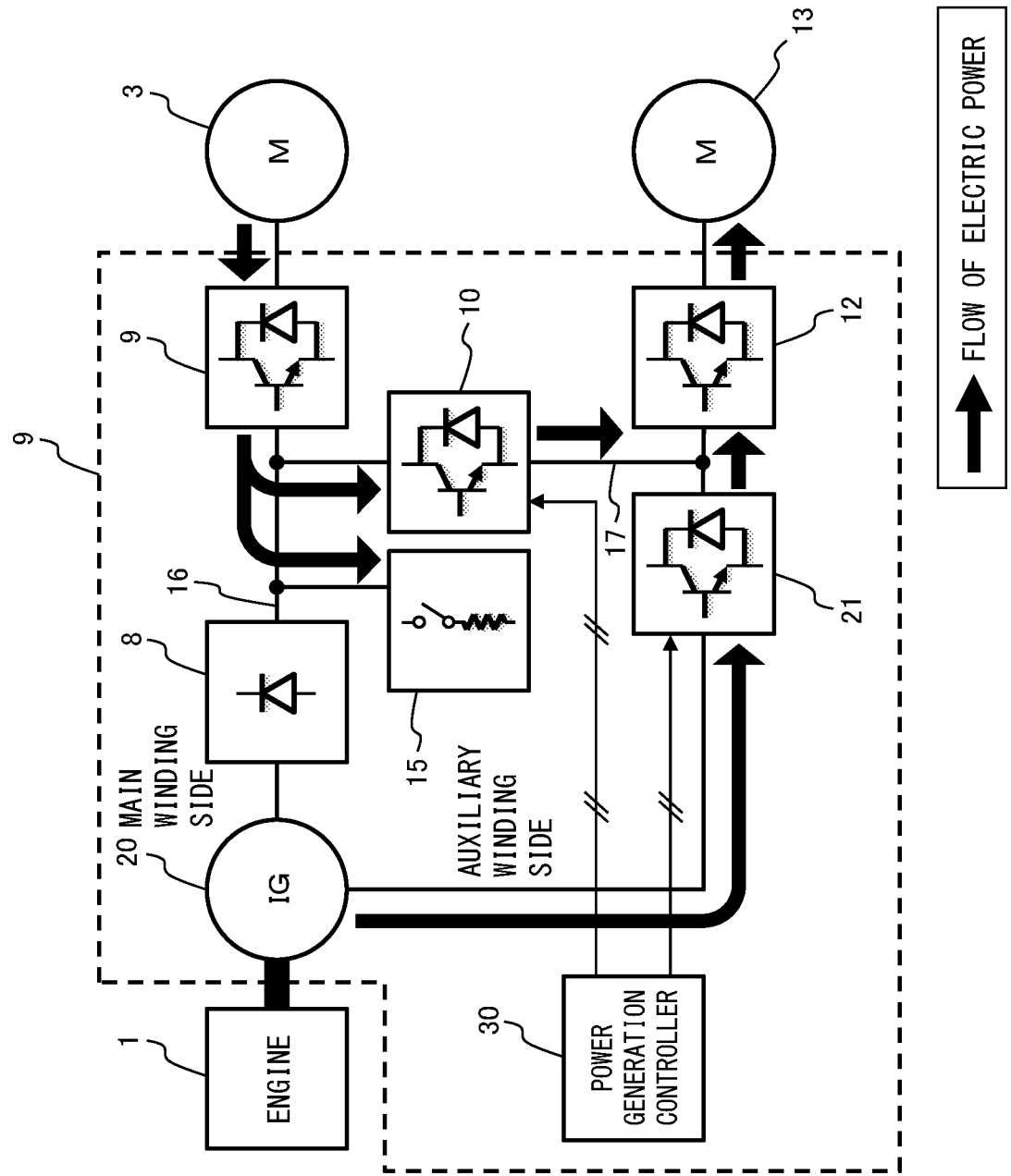
FIG. 12 is a view depicting a flow of electric power of the drive system in a case where it is decided that the vehicle action is retarding.

FIG. 12 depicts a flow of electric power of the drive system 100 in a case where it is decided that the vehicle action is retarding. Referring to FIG. 12, if regenerative power of the traction motor 3 is supplied to the main side DC bus 16, then since the voltage of the main side DC bus 16 is higher than the output voltage of the rectifier 8, the rectifier 8 and the main winding of the two-winding induction generator 20 are placed into a non-conducting state. Part of the regenerative power supplied to the main side DC bus 16 is supplied to the auxiliary side DC bus 17 via the DC-DC converter 10. The remaining part of the regeneration action supplied to the main side DC bus 16 is consumed by the discharging resistor 15. Electric power generated in the auxiliary winding is supplied to the auxiliary side DC bus 17 via the auxiliary converter 21. Consequently, the sum of the output electric power of the auxiliary converter 21 and the output electric power of the DC-DC converter 10 (=auxiliary machine demanded electric power) is supplied to the auxiliary machine inverter 12.

SUMMARY

In the present embodiment, the drive system 100 for a dump truck includes a two-winding induction generator 20 having a primary winding including a main winding and an auxiliary winding, a rectifier 8 that rectifies AC power generated in the main winding into DC power, an auxiliary converter 21 that converts AC power generated in the auxiliary winding into DC power, a traction inverter 9 that is connected to the rectifier 8 via a main side DC bus 16, converts the DC power supplied from the rectifier 8 into AC power, and supplies the AC power to a traction motor 3, an auxiliary machine inverter 12 that is connected to the auxiliary converter 21 via an auxiliary side DC bus 17, converts the DC power supplied from the auxiliary converter 21 into AC power, and supplies the AC power to an auxiliary machine motor 13, and a controller 30 that controls the auxiliary converter 21, in which the drive system 100 includes a DC-DC converter 10 connected to the main side DC bus 16 and the auxiliary side DC bus 17, and the controller 30 controls the DC-DC converter 10 such that electric power of the main side DC bus 16 is supplied to the auxiliary side DC bus 17 via the DC-DC converter 10.

With the present embodiment configured in such a manner as described above, since electric power can be supplied from both of the auxiliary converter 21 and the DC-DC converter 10 to the auxiliary machine inverter 12, increase in reactive electric current flow to the auxiliary converter 21 (drop of the power factor on the auxiliary winding side) can be suppressed. Consequently, it is possible to scale down the auxiliary converter while the efficiency of the drive system is maintained.

Further, the controller 30 decides, on the basis of control signals of the dump truck (accelerator signal, brake signal, vehicle speed, and engine speed), which one of normal traveling, idling, and retarding the action of the dump truck is, and controls, when it is decided that the action of the dump truck is idling or retarding, the DC-DC converter 10 such that electric power of the main side DC bus 16 is supplied to the auxiliary side DC bus 17 via the DC-DC converter 10. Consequently, when there is no load on the main winding side (no load on the traction motor 3) (upon idling or upon retarding), it is possible to supply electric power generated in the main winding or regenerative power of the traction motor 3 to the auxiliary machine inverter 12.

Further, the controller 30, when electric power is to be supplied from the main side DC bus 16 to the auxiliary side DC bus 17 via the DC-DC converter 10, controls the auxiliary converter 21 and the DC-DC converter 10 such that the sum of electric power to be supplied to the auxiliary side DC bus 17 via the auxiliary converter 21 and electric power to be supplied to the auxiliary side DC bus 17 via the DC-DC converter 10 becomes equal to demanded electric power of the auxiliary machine inverter 12. Consequently, it becomes possible to supply just enough auxiliary machine demanded electric power from the auxiliary converter 21 and the DC-DC converter 10 to the auxiliary machine inverter 12.

Although the embodiment of the present invention has been described in detail, the present invention is not limited to the embodiment described above but includes various modifications. For example, the embodiment described above has been explained in detail in order to explain the present invention in a way easy to understand and is not necessarily restricted to those that include all configurations described above.

DESCRIPTION OF REFERENCE CHARACTERS

1: Engine
2: Main generator
3: Traction motor
4: Driven wheel
5: Driving wheel
6: Driving seat
7: Carrier
8: Rectifier
9: Traction inverter
10: DC-DC converter
11: Auxiliary rectifier
12: Auxiliary machine inverter
13: Auxiliary machine motor
14: Auxiliary generator
15: Discharging resistor
16: Main side DC bus
17: Auxiliary side DC bus
20: Two-winding induction generator
21: Auxiliary converter
30, 30X, 30Y: Power generation controller (controller)
31: Vehicle action decision section
32: Converter output power determination section
33: Auxiliary converter controlling section
33a: Voltage controlling section
33b: Current limiting section
33c: Current controlling section
34: DC-DC converter controlling section
34a: Current command computation section
34b: Current controlling section
100, 100X, 100Y: Drive system

The invention claimed is:

1. A drive system for a dump truck, the drive system comprising:
a two-winding induction generator having a primary winding including a main winding and an auxiliary winding;
a rectifier that rectifies alternating-current power generated in the main winding into direct-current power;
an auxiliary converter that converts alternating-current power generated in the auxiliary winding into direct-current power;
a traction inverter that is connected to the rectifier through a main side DC bus, converts the direct-current power supplied from the rectifier into alternating-current power, and supplies the alternating-current power to a traction motor of the dump truck;
an auxiliary machine inverter that is connected to the auxiliary converter through an auxiliary side DC bus, converts the direct-current power supplied from the auxiliary converter into alternating-current power, and supplies the alternating-current power to an auxiliary machine motor of the dump truck; and
a controller that controls the auxiliary converter, wherein
the drive system includes a DC-DC converter connected to the main side DC bus and the auxiliary side DC bus, and
the controller is configured to control the DC-DC converter such that electric power of the main side DC bus is supplied to the auxiliary side DC bus via the DC-DC converter.

2. The drive system for a dump truck according to claim 1, wherein
the controller is configured to decide, on a basis of a control signal of the dump truck, which one of normal traveling, idling, and retarding an action of the dump truck is and control, in a case where it is decided that the action of the dump truck is idling or retarding, the DC-DC converter such that electric power of the main side DC bus is supplied to the auxiliary side DC bus via the DC-DC converter.

3. The drive system for a dump truck according to claim 2, wherein,
the controller is configured to, in a case where electric power is to be supplied from the main side DC bus to the auxiliary side DC bus via the DC-DC converter, control the auxiliary converter and the DC-DC converter such that sum of electric power to be supplied to the auxiliary side DC bus via the auxiliary converter and electric power to be supplied to the auxiliary side DC bus via the DC-DC converter becomes equal to demanded electric power of the auxiliary machine inverter.

* * * * *